United States Patent
Kim et al.

(10) Patent No.: US 8,456,525 B2
(45) Date of Patent: Jun. 4, 2013

(54) DIGITAL DISPLAY DEVICE FOR A DVR SYSTEM THAT RECEIVES A MOVEMENT IMAGE AND A METHOD FOR USING SUCH

(75) Inventors: Min-Chul Kim, Gumi (KR); Hong-Ki Kim, Gumi (KR); Han-Bok Song, Gumi (KR)

(73) Assignee: LG Electronics Inc., Seoul (KR)

( * ) Notice: Subject to any disclaimer, the term of this patent is extended or adjusted under 35 U.S.C. 154(b) by 843 days.

(21) Appl. No.: 12/443,128

(22) PCT Filed: Feb. 15, 2007

(86) PCT No.: PCT/KR2007/000821
§ 371 (c)(1),
(2), (4) Date: Sep. 22, 2009

(87) PCT Pub. No.: WO2008/099980
PCT Pub. Date: Aug. 21, 2008

(65) Prior Publication Data
US 2010/0034523 A1    Feb. 11, 2010

(30) Foreign Application Priority Data
Feb. 14, 2007 (KR) .................. 10-2007-0015418

(51) Int. Cl.
*H04N 7/18* (2006.01)
(52) U.S. Cl.
USPC .......................................... 348/155; 386/228
(58) Field of Classification Search
USPC .................. 348/143, 152–155; 386/200, 212, 386/213, 224, 226, 228
See application file for complete search history.

(56) References Cited

U.S. PATENT DOCUMENTS

| | | | |
|---|---|---|---|
| 5,926,209 A | 7/1999 | Glatt | |
| 6,476,858 B1 | 11/2002 | Ramirez Diaz et al. | |
| 7,746,223 B2 * | 6/2010 | Howarter et al. | 340/506 |
| 2002/0015094 A1 * | 2/2002 | Kuwano et al. | 348/143 |
| 2002/0071031 A1 * | 6/2002 | Lord et al. | 348/143 |
| 2003/0021347 A1 | 1/2003 | Lan et al. | |
| 2004/0013406 A1 | 1/2004 | Barton et al. | |

(Continued)

FOREIGN PATENT DOCUMENTS

| | | | |
|---|---|---|---|
| CN | 1734510 A | | 2/2006 |
| EP | 1150510 A2 | | 10/2001 |
| JP | 63-164783 | * | 7/1988 |
| JP | 07-095559 | * | 4/1995 |

(Continued)

OTHER PUBLICATIONS

Herman Kruegle, "CCTV Surveillance", REFEREX, Dec. 1, 2006, XP040426088, Chapters 2, 5, 7 and 9.

*Primary Examiner* — David Harvey
(74) *Attorney, Agent, or Firm* — Birch, Stewart, Kolasch & Birch, LLP (57) ABSTRACT

Provided are an apparatus for controlling a digital image display apparatus having a tuner and a DVR system, and a method thereof. According to the apparatus, a visitor history is selectively stored only when a user is absent or a movement of a visitor is detected using the digital image display apparatus having the DVR system. Accordingly, not only unnecessary images are not stored, but also a function of an image display device is performed and simultaneously images transmitted from a movement shooting unit mounted separately from the digital image display apparatus can be selectively recorded in order to detect a movement of an object. Therefore, the image display apparatus can be more efficiently utilized.

7 Claims, 4 Drawing Sheets

U.S. PATENT DOCUMENTS

| | | | |
|---|---|---|---|
| 2004/0155961 A1* | 8/2004 | Litwin et al. | 348/155 |
| 2005/0151851 A1 | 7/2005 | Schnell | |
| 2007/0126873 A1* | 6/2007 | Xu et al. | 348/155 |
| 2008/0211911 A1* | 9/2008 | Takeda et al. | 348/143 |

FOREIGN PATENT DOCUMENTS

| | | |
|---|---|---|
| KR | 10-2004-0019357 A | 3/2004 |
| KR | 10-2006-0086505 A | 8/2006 |

* cited by examiner

DIGITAL DISPLAY DEVICE FOR A DVR SYSTEM THAT RECEIVES A MOVEMENT IMAGE AND A METHOD FOR USING SUCH

TECHNICAL FIELD

The present invention relates to a digital image display apparatus, and more particularly, to a digital image display apparatus having a digital video recorder (DVR) system and a control method thereof, for selectively storing a visitor history using a digital image receiver in which the DVR having a storing function is mounted only when a user is absent or movement of a visitor is detected.

BACKGROUND ART

A DVR generally called a hard disk recorder (HDR) or a personal video recorder (PVR) stores digital broadcasting signals as well as analog broadcasting signals using a large capacity storage device such as a hard disk drive (HDD), and allows a user to reproduce and view the stored broadcasting signals when necessary.

The DVR has a basic function of storing a program transmitted from a broadcasting station and viewing the stored program, but is discriminated from a related art video cassette recorder (VCR) in that it records data in an HDD and reproduces the data stored in the form of a file as in a computer, and has a central processing unit (CPU) and an operating system (OS) for reproduction, a memory chip containing a reproduction software, and the HDD.

That is, the DVR includes a television (TV) tuner, a storage and reproduction software, a modem, and an HDD. The DVR has a great advantage in that it converts a TV program into digital signals, stores the digital signals in the HDD, and reproduces the stored digital signals when necessary using the HDD that is adopted for a computer.

Moreover, the DVR provides more improved functions compared to a related art analog VCR by providing various functions such as a time shift function, and an instant replay function while live broadcasting is viewed besides a recording function, which is a basic function. Particularly, an advantage that high definition (HD) level high quality digital broadcasting can be stored in an HDD and viewed whenever necessary, and various additional service functions provide great usefulness to a user.

The above-described DVR can be applied to a monitoring system, and is a security solution system of high resolution that can record monitored images for a long time, and perform swift searching and clear reproducing of the recording images by converting analog image signals input from a plurality of monitoring cameras into digital signals, and compressing the digital signals. Demand for the DVR increases in a financial organization or an airport indispensably requiring high resolution security.

The above-described apparatus to which a monitoring system is applied uses technology of outputting a moving image and a voice of a visitor through a door bell to a corresponding image display device, or of detecting and storing movement of a visitor, and checking stored images using an image display device. The above-described apparatus can be a digital image display device having a DVR system, including a DVR having an HDD, a camera for monitoring movement of a person, and a display system.

However, an image display device of a related art keeps storing even unnecessary images as continuously detected movements are stored when a monitoring system is still in operation, which causes unpleasant feeling to a user who reproduces afterward and a storage capacity is utilized inefficiently.

DISCLOSURE OF INVENTION

Technical Problem

An object of the present invention is to provide a system and a method for transmitting control signals by detection of movement to an image display device only when movement is detected, receiving image signals that have detected movement thereafter, and storing and reproducing the image signals.

Another object of the present invention is to provide a system and a method for detecting movement, allowing a movement shooting unit itself to transmit a movement image to an image display device only when movement is detected to store and reproduce the image.

Technical Solution

An aspect of the present invention, there is provided an apparatus for controlling a digital image display apparatus having a tuner and a digital video recorder system, the apparatus including: a digital image receiving device for shooting an object in an outside, controlling movement images obtained by shooting the object to be recorded and reproduced through the digital video recorder system in response to a movement detection control signal transmitted when the shot object moves, and simultaneously, controlling image signals received via the tuner to be viewed.

Another aspect of the present invention is to provide a method for controlling a digital image display device having a tuner and a digital video recorder system, the method including: when a movement detection control signal is received from an outside, receiving shot movement images; receiving the movement images to record the received movement images in the digital video recorder system; and reproducing the movement images recorded in the digital video recorder system according to a request of a user.

Further another aspect of the present invention is to provide a digital image display apparatus having a tuner and a digital video recorder system, the apparatus including: a digital image receiving device for shooting an object in an outside, controlling transmitted movement images to be received, recorded, and reproduced through the digital video recorder system only when the shot object moves, and simultaneously, processing images received via the tuner so that the images are viewed.

Yet another aspect of the present invention is to provide a method for controlling a digital image display device having a tuner and a digital video recorder system, the method including: when movement detecting images are received from an outside, judging whether a closed circuit television mode is set in advance; when the closed circuit television mode is set in advance, analyzing received image signals; and when movement images are contained in the analyzed image signals, controlling the movement images to be recorded and reproduced.

Advantageous Effects

A digital image display device having a DVR system and a control method thereof according to the present invention provide following effects.

First, the present invention includes a movement shooting unit for detecting a movement of an object to receive movement images transmitted from the movement shooting unit and selectively store the received images. Accordingly, the present invention allows movement images to be selectively stored depending on whether a movement detecting control signal by movement detection is input from the movement shooting unit.

Second, since the present invention detects whether a movement image is input to allow the movement image to be selectively stored. Accordingly, unnecessary images are not stored.

Third, since a function of an image display device is performed, and simultaneously, movement images transmitted from an image shooting unit can be selectively recorded and reproduced, the image display device can be more efficiently utilized.

BEST MODE FOR CARRYING OUT THE INVENTION

Reference will now be made in detail to the preferred embodiments of the present invention, examples of which are illustrated in the accompanying drawings.

Figure 1:
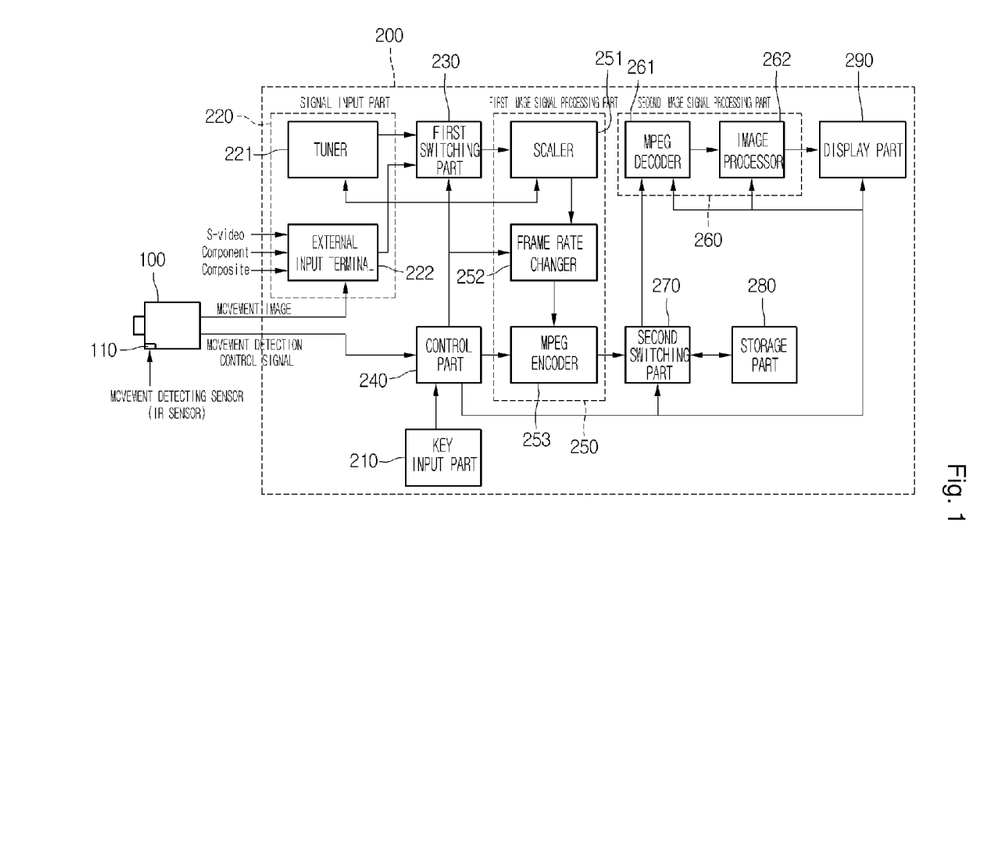
FIG. 1 is a block diagram illustrating a construction of a digital image display apparatus having a DVR system according to the present invention.
Figure 2:
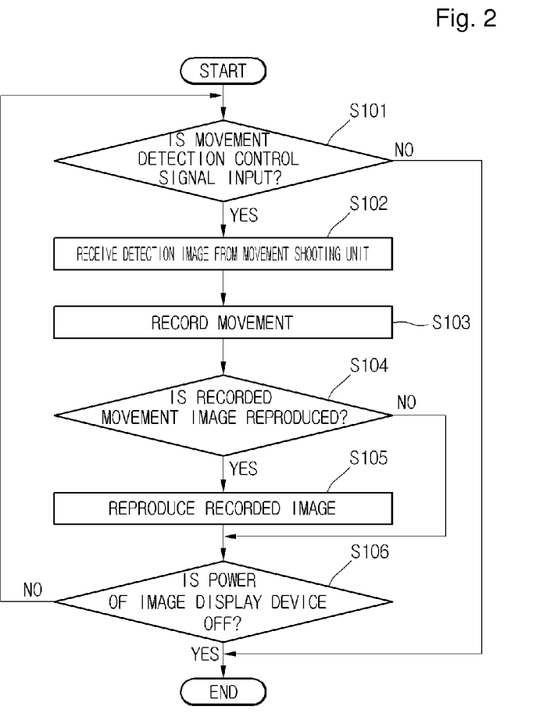
FIG. 2 is a flowchart illustrating a method of controlling a digital image display apparatus having a DVR system according to the present invention.

FIG. 1 is a block diagram illustrating a construction of a digital image display apparatus having a DVR system according to the present invention, and FIG. 2 is a flowchart illustrating a method of controlling a digital image display device having a DVR system according to the present invention.

Referring to FIG. 1, the digital image display apparatus having the DVR system includes: a movement shooting unit 100 for detecting a movement of an object; and an image display device 200 for receiving an image signal input from an outside or an image signal by a movement of an object in response to a detection signal from the movement shooting unit 100, and controlling images to be recorded and viewed according to a mode set in advance by a user.

Also, the image display device 200 includes: a key input part 210 for receiving a desired command from a user; a control part 240 for receiving a user request command input via the key input part 210, and a movement detection signal by a movement of an object, and controlling images to be recorded or reproduced; a signal input part 220 for receiving image signals input via an antenna (not shown), image signals input via an external apparatus, or image signals by a movement of the object; a first switching part 230 for selectively outputting image signals input via the signal input part 220 in response to a control signal of the control part 240, the image signals being input in response to the movement detection signal of the object; a first image signal processing part 250 for processing image signals selected by the first switching part 230; a storage part 280 for storing the image signals processed by the first image signal processing part 250; a second switching part 270 for switching image signals such that the image signals processed by the first image signal processing part 250 are stored in the storage part 280 or displayed in response to a control signal of the control part 240; and a second image signal processing part 260 for processing images such that image signals switched by the second switching part 270 are displayable on a display part 290.

Here, the signal input part 220 includes a tuner 221 for selecting image signals received via the antenna (not shown), and an external input terminal 222 for receiving image signals via an external apparatus and the movement shooting unit 100.

Also, the first image signal processing part 250 includes: a scaler 251 for receiving and scaling image signals switched by the first switching part 230; a frame rate changer 252 for changing the frame rate of image signals scaled by the scaler 251 in response to a control signal of the control part 240; and an MPEG encoder 253 for MPEG-encoding the image signals whose frame rate has been changed by the frame rate changer 252.

Also, the second image signal processing part 260 includes: an MPEG decoder 261 for decoding image signals switched by the second switching part 270 in response to a control signal of the control part 240; and an image processor 262 for processing images such that image signals decoded by the MPEG decoder 261 are displayed.

According to the digital image display apparatus having the DVR system, when a movement of an object is detected by a movement detecting sensor 110 of the movement shooting unit 100, the movement shooting unit 100 transmits a movement detection control signal to the control part 240 of the image display device 200.

Also, the movement shooting unit 100 delivers image signals detected by the movement detecting sensor 110 to the image display device 200 via the external input terminal 222. The control part 240 outputs a control signal to the first switching part 230 so that image signals input via the tuner 221 and the external input terminal 222 of the signal input part 220 are selectively output.

Also, when a movement detection control signal is input from the movement shooting unit 100, the control part 240 checks whether the image display device is used for viewing images and controls images detected by the movement shooting unit 100 to be stored in the storage part 280 regardless of the viewing.

Also, to reproduce images stored in the storage part 280, the control part 240 outputs a control signal to the second switching part 270 to allow the storage part 280 to store and reproduce images through the second switching part 270.

Therefore, when images currently received via the tuner are in a viewing state, movement images stored in the storage part 280 may be reproduced through a sub-screen such as picture in picture (PIP) and picture on picture (POP) according to a request of a user. Also, images received via the tuner may be primary/secondary switched and displayed on a sub-screen such as PIP and POP, and movement images stored in the storage part 280 may be displayed on a main screen.

A method for controlling a digital image display apparatus having a DVR system will be described with reference to FIG. 2. First, whether a movement detection control signal is input from the movement shooting unit is judged (S101).

Subsequently, when the movement detection control signal is input from the movement shooting unit as a result of the judgment (S101), movement detection images are received from the movement shooting unit (S102).

Also, received movement detection images are recorded (S103).

Subsequently, when a user intends to reproduce the recorded movement images, the recoded movement images are reproduced (S104 and S105).

Last, when a power off command of the image display apparatus is input by the user, all processes are ended (S106).

The digital image display apparatus of the image display device, having the DVR system and the controlling method thereof receive a movement detection control signal from the movement detecting sensor for detecting a movement of an object, and receives movement images of the object detected by the movement shooting unit 100 and controls the movement images to be stored in the storage part 280 only when the control signal is input.

Also, when the image display device is in a viewing state, the apparatus controls viewing and storing operations to be simultaneously performed. On the other hand, when the image display device is not in the viewing state, the apparatus controls only movement images of an object detected by the movement shooting unit 100 to be stored.

Also, when a reproduction command is input by a user afterward, the movement images stored in the storage part 280 are displayed through a main screen or a sub-screen (PIP or POP) of the display part 290.

MODE FOR THE INVENTION

A digital image display apparatus having a DVR system and a method thereof according to an embodiment of the present invention will be described with reference to the accompanying drawings.

Figure 3:
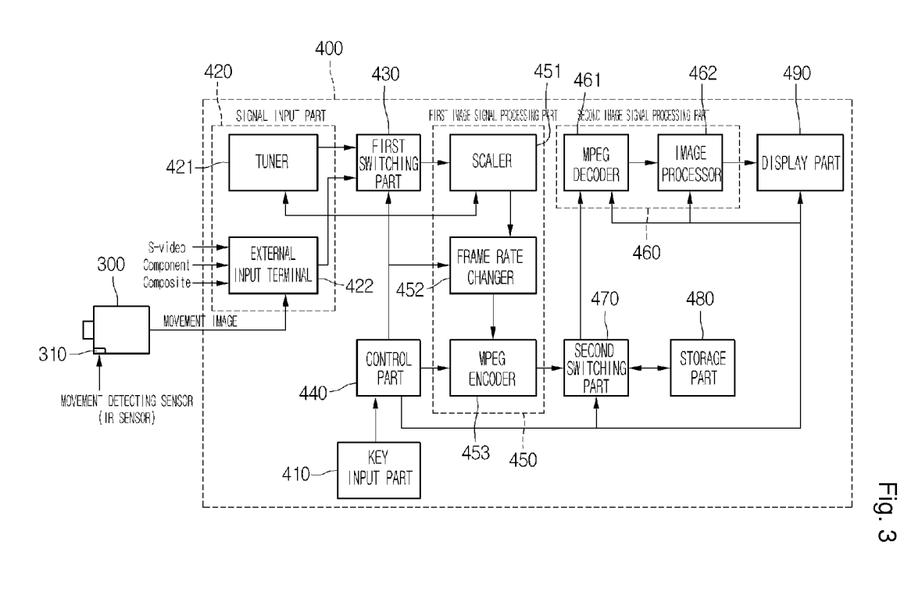
FIG. 3 is a block diagram illustrating a construction of a digital image display apparatus having a DVR system according to an embodiment of the present invention.
Figure 4:
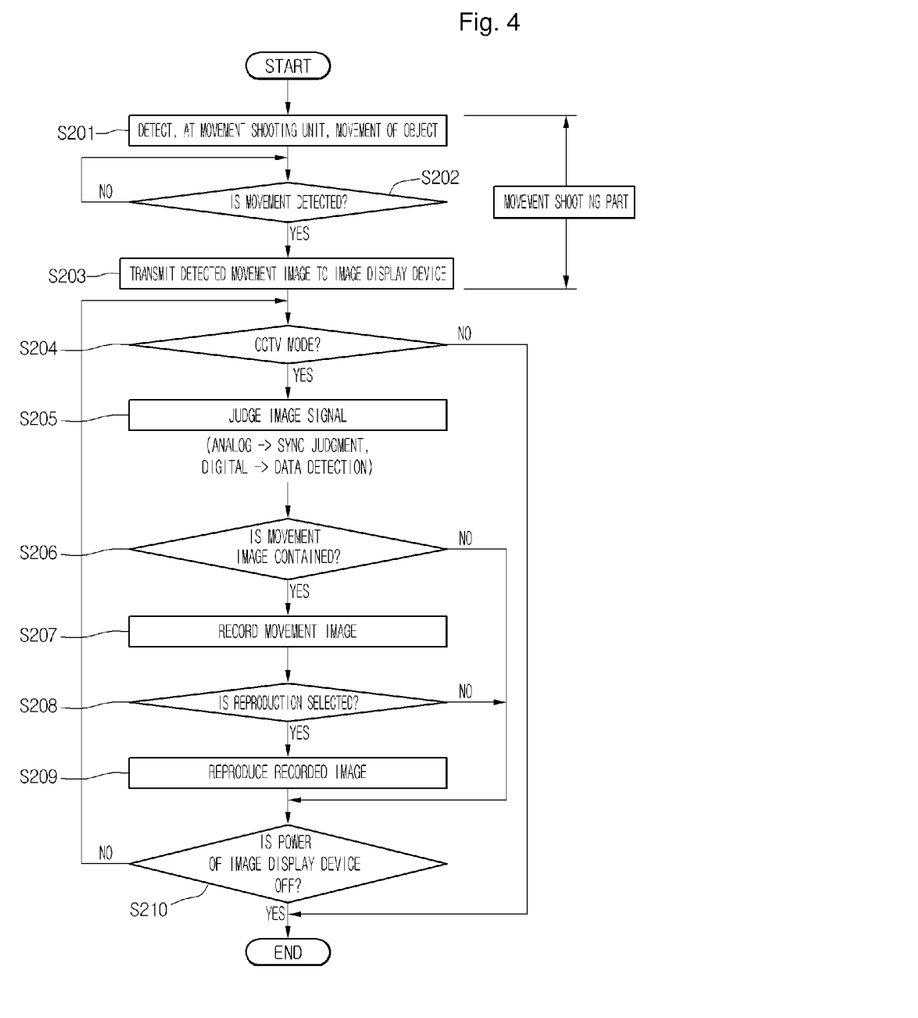
FIG. 4 is a flowchart illustrating a method of controlling a digital image display apparatus having a DVR system according to an embodiment of the present invention.

FIG. 3 is a block diagram illustrating a construction of a digital image display apparatus having a DVR system according to an embodiment of the present invention, and FIG. 4 is a flowchart illustrating a method of controlling a digital image display apparatus having a DVR system according to an embodiment of the present invention.

Referring to FIG. 3, the digital image display apparatus having the DVR system includes a movement shooting unit 300 for outputting movement images of an object only when the object moves, and an image display device 400 for receiving movement images input via the movement shooting unit 300 and external image signals, and controlling the images or the image signals to be recorded or reproduced.

Also, the image display device 400 includes: a signal input part 420 for receiving image signals output only when a movement of an object is detected by the movement shooting unit 300, image signals input via a tuner (not shown), and image signals input via an external apparatus; a firs switching part 430 for selectively outputting image signals input via the signal input part 420; a key input part 410 for receiving a desired command from a user; a control part 440 for controlling image signal switched by the first switching part 430 to be recorded or viewed in response to a user request command input via the key input part 410; a first image signal processing part 450 for processing image signals selected by the first switching part 430; a storage part 480 for storing image signals processed by the first image signal processing part 450; a second switching part 470 for switching image signals such that the image signals processed by the first image signal processing part 450 are stored in the storage part 480 or displayed in response to a control signal of the control part 410; and a second image signal processing part 460 for processing image signals such that the image signals switched by the second switching part 470 to be displayable on a display part 490.

Here, the storage part 480 includes a storage medium such as an HDD to perform a DVR function.

The first image signal processing part 450 includes: a scaler 451 for receiving and scaling image signals switched by the first switching part 430; a frame rate changer 452 for changing the frame rate of image signals scaled by the scaler 451 in response to a control signal of the control part 440; and an MPEG encoder 453 for MPEG-encoding the image signals whose frame rate has been changed by the frame rate changer 452.

Also, the second image signal processing part 460 includes: an MPEG decoder 461 for decoding image signals switched by the second switching part 470; and an image processor 462 for processing image signals decoded by the MPEG decoder 461 such that they are displayable on the display part 490.

An operation of the digital image display apparatus having the DVR system will be described. When a movement of an object is detected by a movement detecting sensor 310 of the movement shooting unit 300, the movement shooting unit 300 transmits detected image signals via the external input terminal 422 only when a movement of an object is detected by the movement detecting sensor 310.

Image signals by the movement of the object are received depending on whether analog images or digital images are input via the external input terminal 422, and processed so that they can be stored in the storage part 480.

That is, the movement shooting unit 300 delivers detected image signals to the image display device 400 via the external input terminal 422 only when a movement of the object is sensed by the movement detecting sensor 310. The control part 440 outputs a control signal to the first switching part 430 so that image signals input via a tuner 421 of the signal input part 400 and the external input terminal 422 are selectively output.

Also, when movement images of an object are obtained from the movement shooting unit 300, the control part 440 analyzes whether the image display device is used for viewing, and controls images shot by the movement shooting unit 300 to be stored in the storage part 280 according to a mode set in advance regardless of viewing.

Also, to reproduce images stored in the storage part 480, the control part 440 outputs a control signal to the second switching part 470 to allow the storage part 480 to store and reproduce images through the second switching part 470.

That is, in the case where a CCTV mode is set in advance, the control part 440 performs operations such that images are recorded, i.e., stored in the storage part 480 only when image signals are input from the movement shooting part 300. At this point, whether image signals are input from the movement shooting unit 300 can be judged by judging whether a synchronization signal is input in the case of analog signals, and by detecting data in the case of digital signals.

Also, when a reproduction command is input via a key input part 410 according to a request of a user, the control part 440 performs operations such that images stored in the storage part 480 are reproduced.

Therefore, images that have been viewed can be displayed through a main screen or a sub-screen such as PIP and POP. In the case where images obtained by the movement shooting unit 300 are reproduced, the images can be reproduced through the main screen or the sub-screen such as PIP and POP.

A method for controlling a digital image display apparatus having a DVR system will be described with reference to FIG. 4. A movement of an object is detected through the movement shooting unit 300 (S201).

Also, detected movement images are transmitted to the image display device only when the movement of the object is detected (S202 and S203).

Subsequently, whether a CCTV mode has been set in advance is judged (S204).

When the CCTV mode has been set in advance as a result of the judgment (S204), whether movement images are transmitted through input image signals is judged (S205).

Subsequently, whether movement images are contained in the image signals is judged (S206).

When the movement images are contained in the image signals as a result of the judgment (S206), the movement images are recorded (S207).

After that, when a reproduction command is input by a user, the recorded movement images are reproduced (S208 and S209).

Last, when a power off command of the image display device is input by the user, operations are ended (S210).

According to the above-described digital image display apparatus having the DVR system and the control method thereof, movement images detected by the movement shooting unit 300 are delivered to the signal input part 420 only when a movement of an object is detected by the movement detecting sensor 310 of the movement shooting unit 300 for detecting the movement of the object. The image display device 400 analyzes whether movement images are input via the signal input part 420, and controls the movement images to be stored in the storage part 480.

Also, when the image display device is in a viewing state, the apparatus controls viewing and storing operations to be simultaneously performed. On the other hand, when the image display device is not in the viewing state, the apparatus controls only movement images of an object detected by the movement shooting unit 300 to be stored according to a mode set in advance.

Also, when a reproduction command is input by a user afterward, the movement images stored in the storage part 480 are displayed through the display part 490.

INDUSTRIAL APPLICABILITY

The present invention provides a movement shooting unit for detecting a movement of an object to receive movement images transmitted from the movement shooting unit and selectively store the received images. Accordingly, the present invention allows the movement images to be selectively stored depending on whether a movement detecting control signal by movement detection is input from the movement shooting unit. Also, since data storing is performed by detecting whether an image signal itself detected by the movement shooting unit is input, unnecessary images are not stored. Also, since a function of an image display device is performed, and simultaneously, movement images transmitted from a monitoring camera can be selectively recorded, the image display device can be more efficiently utilized.

The invention claimed is:

1. A digital image display apparatus comprising:
    a tuner;
    a display part configured to display an image signal received by the tuner;
    a movement shooting unit configured to detect a movement of an object;
    an external input terminal configured to receive a movement image from the movement shooting unit, the movement image being transmitted from the movement shooting unit to the external input terminal only when a movement of an object is detected;
    a first switching part configured to switchably output the image signal input from the tuner or the movement image input from the external input terminal;
    a storage part configured to store the received movement image;
    a control part configured to control the first switching part so that the displaying of the image signal received by the tuner and the storing of the movement image received by the external input terminal are simultaneously performed when the digital image display apparatus is used for viewing the movement image;
    a key input part configured to receive a desired command from a user;
    a first image signal processing part configured to process the image signal output from the first switching part;
    a second switching part configured to switch image signals such that the image signals processed by the first image signal processing part are stored in the storage part or displayed in response to a control signal output from the control part; and
    a second image signal processing part configured to process images such that the image signals switched by the second switching part are displayable on the display part.

2. The apparatus according to claim 1, wherein the first image signal processing part comprises:
    a scaler configured to receive and scale image signals switched by the first switching part;
    a frame rate changer configured to change the frame rate of image signals scaled by the scaler in response to a control signal of the control part; and
    an MPEG encoder configured to MPEG-encode the image signals whose frame rate has been changed by the frame rate changer.

3. The apparatus according to claim 1, wherein the second image signal processing part comprises:
    an MPEG decoder configured to decode image signals switched by the second switching part in response to a control signal of the control part; and
    an image processor configured to process images such that image signals decoded by the MPEG decoder are displayed.

4. The apparatus according to claim 1, wherein the control part is also configured to control image signals by movement detection of the object to be stored in the storage part, and simultaneously, to control received broadcasting signals to be viewed when a closed circuit television mode is set through the key input part by a user.

5. A digital image display apparatus comprising:
    a tuner;
    a digital video recorder system;
    a display part configured to display an image signal received by the tuner;
    a digital image receiving device configured to shoot an outside object, and to control transmitted movement images to be received, recorded, and reproduced through the digital video recorder system only when the shot outside object moves, and simultaneously, to process images received via the tuner and to display the image signal received by the tuner;
    a signal input part configured to receive image signals output only when a movement of the object is detected from an outside, via the tuner or via an external apparatus;
    a first switching part configured to selectively output image signals input via the signal input part;
    a key input part configured to receive a desired command from a user;
    a control part configured to record or view image signals switched by the first switching part in response to a user request command input via the key input part;
    a first image signal processing part configured to process image signals selected by the first switching part;

a storage part configured to store the image signals processed by the first image signal processing part;

a second switching part configured to switch image signals such that the image signals processed by the first image signal processing part are stored in the storage part or displayed in response to a control signal of the control part; and a second image signal processing part configured to process images such that the image signals switched by the second switching part are displayable on a display part.

6. The apparatus according to claim 5, wherein the first image signal processing part comprises:

a scaler configured to receive and scale image signals switched by the first switching part;

a frame rate changer configured to change the frame rate of image signals scaled by the scaler in response to a control signal output from the control part; and an MPEG encoder configured to MPEG-encode the image signals whose frame rate has been changed by the frame rate changer.

7. The apparatus according to claim 5, wherein the second image signal processing part comprises:

an MPEG decoder configured to decode image signals switched by the second switching part in response to a control signal of the control part; and an image processor configured to process the image signals such that the image signals decoded by the MPEG decoder are displayed.

* * * * *